US011627613B2

(12) United States Patent
Prabhakar et al.

(10) Patent No.: US 11,627,613 B2
(45) Date of Patent: Apr. 11, 2023

(54) MECHANISM FOR LOW LATENCY COMMUNICATION USING HISTORICAL BEAM INFORMATION

(71) Applicant: Apple Inc., Cupertino, CA (US)

(72) Inventors: Alosious Pradeep Prabhakar, Singapore (SG); Li Su, San Jose, CA (US); Vijay Venkataraman, San Jose, CA (US); Rohit R. Matolia, Surat (IN)

(73) Assignee: Apple Inc., Cupertino, CA (US)

( * ) Notice: Subject to any disclaimer, the term of this patent is extended or adjusted under 35 U.S.C. 154(b) by 370 days.

(21) Appl. No.: 17/111,237

(22) Filed: Dec. 3, 2020

(65) Prior Publication Data

US 2021/0185739 A1 Jun. 17, 2021

(30) Foreign Application Priority Data

Dec. 13, 2019 (IN) .............................. 201941051687

(51) Int. Cl.
*H04W 76/10* (2018.01)
*H04W 76/30* (2018.01)
*H04W 4/02* (2018.01)
*H04W 74/08* (2009.01)
*H04W 8/02* (2009.01)

(52) U.S. Cl.
CPC ........... *H04W 76/10* (2018.02); *H04W 4/027* (2013.01); *H04W 8/02* (2013.01); *H04W 74/0833* (2013.01); *H04W 76/30* (2018.02)

(58) Field of Classification Search
CPC ....... H04W 76/10; H04W 4/027; H04W 8/02; H04W 74/0833; H04W 76/30; H04W 16/28; H04B 7/0408; H04B 7/0695
See application file for complete search history.

(56) References Cited

U.S. PATENT DOCUMENTS

| 2018/0139760 A1* | 5/2018 | Lee ........................ H04W 68/02 |
| 2019/0132851 A1* | 5/2019 | Davydov .............. H04L 5/0053 |
| 2019/0150161 A1* | 5/2019 | Cheng ................... H04W 24/10 370/330 |

(Continued)

FOREIGN PATENT DOCUMENTS

| WO | 2017151187 A1 | 9/2017 |
| WO | 2018/109563 A2 | 6/2018 |
| WO | 2018117248 A1 | 6/2018 |

OTHER PUBLICATIONS

First Examination Report for IN Patent Application No. 201941051687; dated Oct. 12, 2021.

*Primary Examiner* — Ashley Shivers
(74) *Attorney, Agent, or Firm* — Kowert, Hood, Munyon, Rankin & Goetzel, P.C.

(57) ABSTRACT

This disclosure relates to techniques for a wireless device to perform low latency communication using historical beam information. The wireless device may establish a radio resource control connection, and may subsequently release the resource control connection. The wireless device may store antenna element and beam information for the resource control connection. The wireless device may determine whether to use the stored antenna element and beam information when establishing another radio resource control connection. If the wireless device determines to do so, the wireless device may use the stored antenna element and beam information when establishing that radio resource control connection.

20 Claims, 7 Drawing Sheets

(56) References Cited

U.S. PATENT DOCUMENTS

| | | | |
|---|---|---|---|
| 2019/0182800 A1* | 6/2019 | Park | .................. H04L 5/0048 |
| 2019/0363843 A1 | 11/2019 | Gordaychik | |
| 2020/0100118 A1 | 3/2020 | Sun et al. | |
| 2020/0163074 A1* | 5/2020 | Tang | .................. H04W 16/28 |
| 2020/0358515 A1 | 11/2020 | Li et al. | |
| 2020/0374863 A1 | 11/2020 | Lin et al. | |
| 2021/0410107 A1* | 12/2021 | Park | .................. H04W 76/27 |

\* cited by examiner

| S.No | Beam Identifier | PCI | Angle 'θ', Azimuth 'α' & Elevation 'e' | Location GPS/ Wi-Fi SSID | Last used Antenna & Antenna Element |
|---|---|---|---|---|---|
| 1 | 0 | 15 | θ = 60°<br>α = -30°<br>e = 10m | xxxxx | Antenna #1, Element #2 |
| 2 | 3 | 15 | θ = -30°<br>α = 60°<br>e = -20m | xxxxx | Antenna #3, Element #1 |
| 3 | 7 | 29 | θ = 0°<br>α = 0°<br>e = 20m | xxxxx | Antenna #4, Element #4 |

*FIG. 8*

MECHANISM FOR LOW LATENCY COMMUNICATION USING HISTORICAL BEAM INFORMATION

PRIORITY CLAIM

This application claims benefit of priority to Indian Application No. 201941051687, titled "Mechanism for Low Latency Communication Using Historical Beam Information", filed Dec. 13, 2019, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for a wireless device to perform low latency communication using historical beam information.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for a wireless device to perform low latency communication using historical beam information.

According to the techniques described herein, a wireless device may be configured to store antenna and beam information used to perform cellular communication, along with information usable for identifying a location and/or orientation of the wireless device associated with the antenna and beam information. When subsequently performing antenna and/or beam selection to perform cellular communication (e.g., after a break in performing cellular communication), the wireless device may be able to determine whether the stored antenna and beam information may be applicable to its current location and orientation. If the stored antenna and beam information may be applicable to the current location and orientation of the wireless device, the wireless device may use the stored antenna and beam information as part of the antenna and/or beam selection process. For example, in such a scenario, instead of performing beam sweeping, beam measurement, beam selection, and beam reporting, the wireless device may directly select and use the previously used beam (and the antenna(s) used to form that beam).

Such techniques may reduce the latency and/or power consumption to establish (or re-establish) a cellular communication session in at least some circumstances, at least according to some embodiments. For example, such techniques may be useful for a wireless device that frequently (or at least occasionally) remains in the same position and orientation, for a wireless device that requires or otherwise particularly benefits from low latency communication, and/or for various other possible types of wireless devices.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 8 illustrates an exemplary possible UE beam reference table that could be used when establishing a RRC connection, according to some embodiments.

Figure 1:
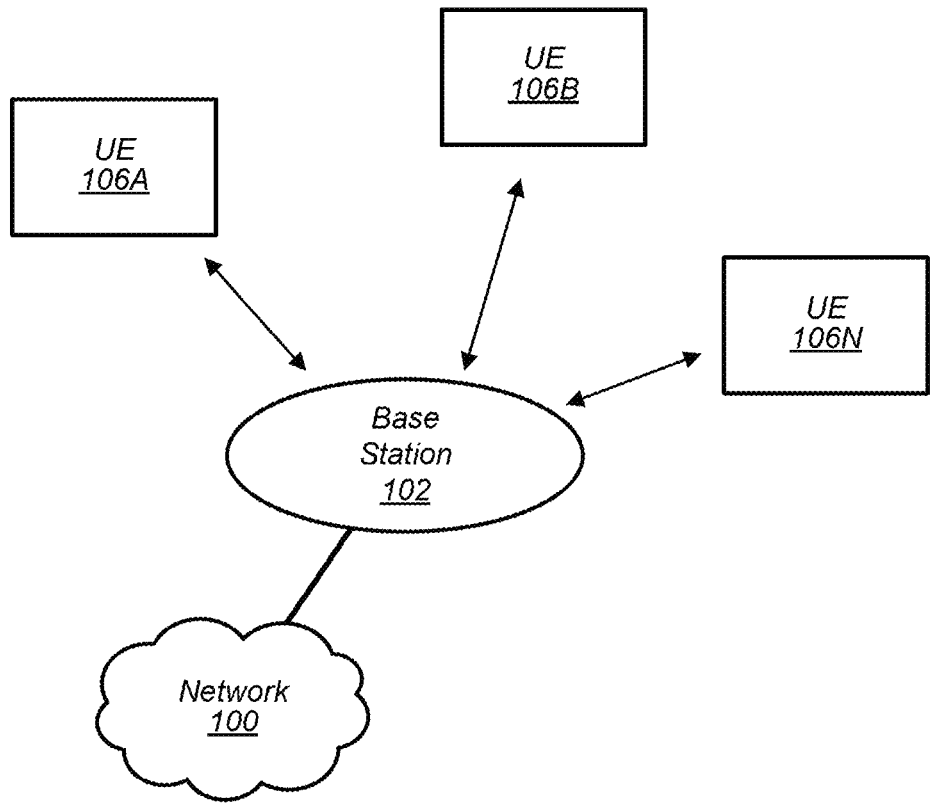
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology

Terms

The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
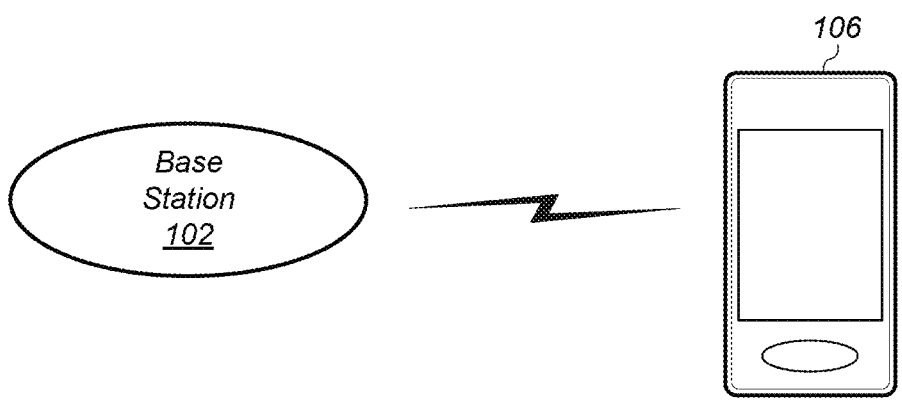
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to re-establish a packet data network connection such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
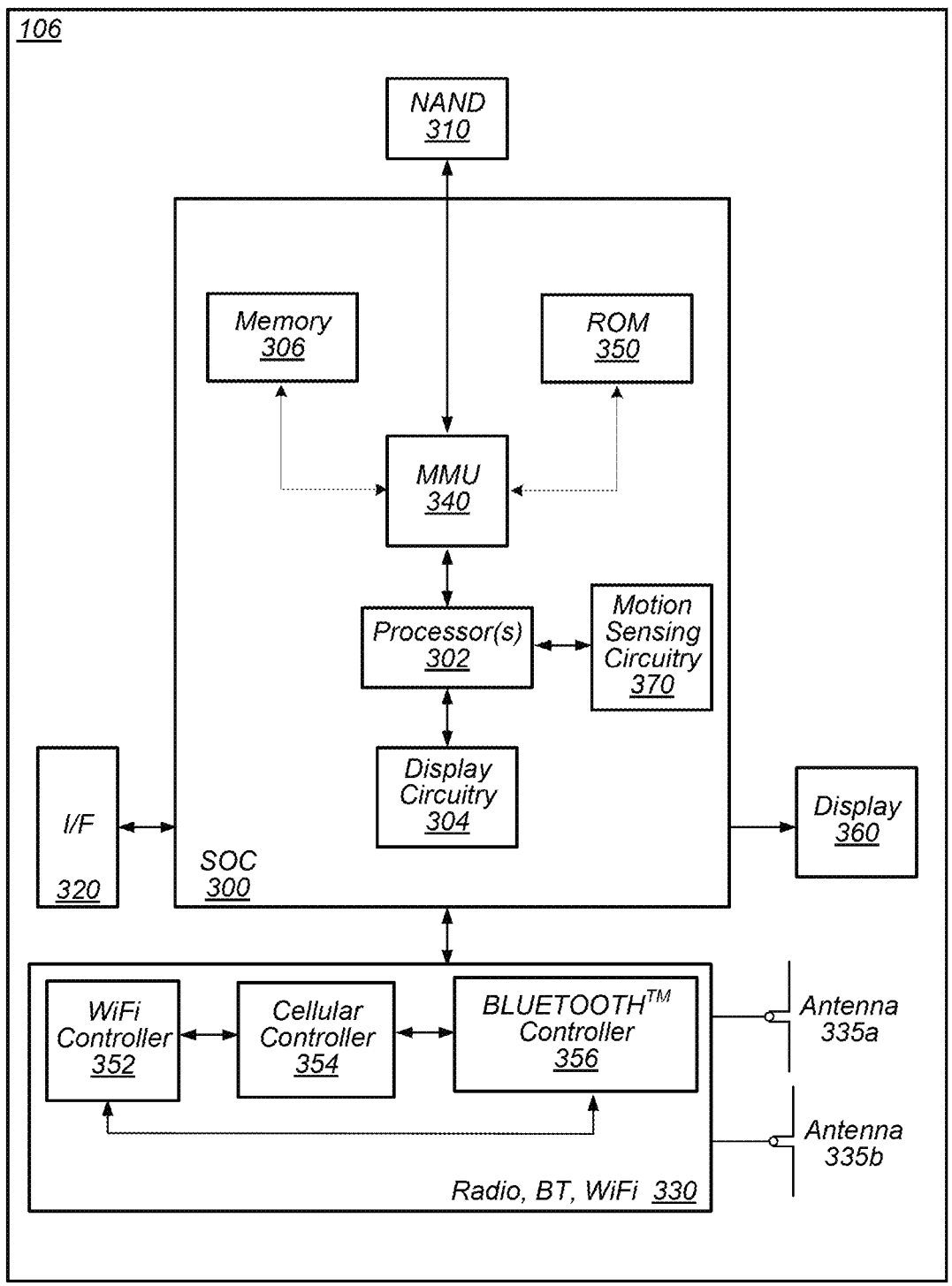
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform low latency communication using historical beam information such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform low latency communication using historical beam information according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
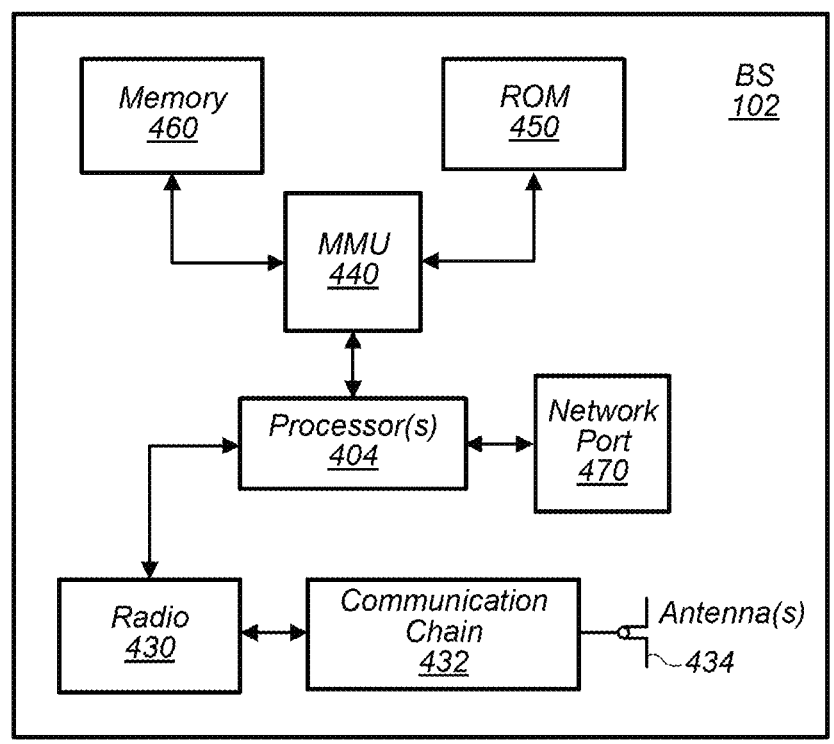
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard.

Figure 5:
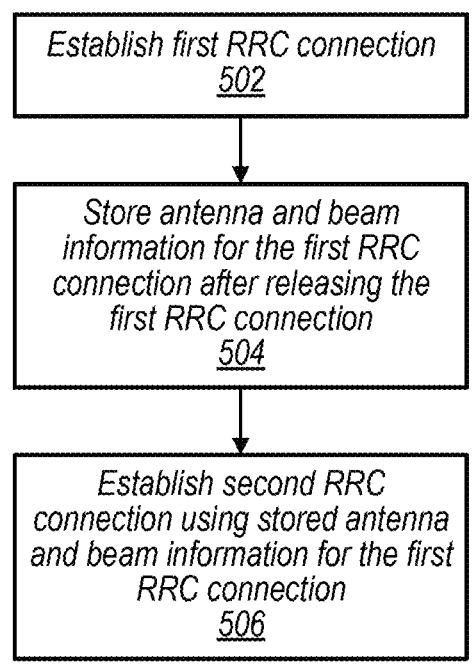
FIG. 5 is a flowchart diagram illustrating aspects of an exemplary possible method for a wireless device to perform low latency communication using historical beam information, according to some embodiments.

FIG. 5—Low Latency Communication Using Historical Beam Information

FIG. 5 is a flowchart diagram illustrating a method for a wireless device (e.g., a wireless user equipment (UE) device, as one possibility) to perform low latency communication using historical beam information.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with LTE, LTE-A, NR, and/or 3GPP specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, a wireless device may establish a wireless link with a cellular base station. According to some embodiments, the wireless link may include a cellular link according to long term evolution (LTE). For example, the wireless device may establish a session with a mobility management entity of the cellular network by way of an eNB that provides radio access to the cellular network. As another possibility, the wireless link may include a cellular link according to 5G NR. For example, the wireless device may establish a session with an AMF entity of the cellular network by way of a gNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a ("first") RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

In 504, the wireless device may store antenna and beam information for the first RRC connection after releasing the first RRC connection. For example, the antenna and beam information may include an indication of which antenna(s)/antenna element(s) was (were) last used for the first RRC connection prior to its release, and an indication of a cell (e.g., physical cell identifier) and beam (e.g., a synchronization signal block index associated with the beam) used for the first RRC connection prior to its release. The wireless device may also store orientation information (e.g, azimuth, angle, and elevation information) for the wireless device associated with the antenna and beam information, and/or location information (e.g., GPS coordinates, a Wi-Fi service set identifier (SSID), etc.) associated with the antenna and beam information, at least according to some embodiments.

In 506, the wireless device may establish another ("second") RRC connection. The wireless device may use the stored antenna and beam information for the first RRC connection when establishing the second RRC connection. For example, the wireless device may perform a physical random access (PRACH) procedure with the cell indicated in the stored antenna and beam information, using the antenna(s) (and possibly more specifically the antenna element(s)) and beam indicated in the stored antenna and beam information.

At least according to some embodiments, the use of the stored antenna and beam information when establishing the second RRC connection may be conditional, e.g., based on one or more considerations. For example, if the wireless device has moved to another location or changed orientation, or possibly even if another object (e.g., person, vehicle, foliage, etc.) has altered the availability of line-of-sight between the wireless device and the cell indicated in the stored antenna and beam information, it may be the case that a PRACH procedure using the stored antenna and beam information would not be successful.

Thus, at least as one possibility, the wireless device may determine whether it has undergone mobility (e.g., performed cell re-selection) and/or if it has changed position (e.g., experienced motion and/or rotation) since releasing the first RRC connection, and may determine whether to use the stored antenna and beam information for the first RRC connection when establishing the second RRC connection based at least in part on whether the wireless device has undergone mobility and/or changed position since releasing the first RRC connection. For example, if the wireless device has undergone mobility and/or changed position since releasing the first RRC connection, the wireless device may determine to not use the stored beam and antenna information to establish the second RRC connection. In such a scenario, it may be the case that the wireless device instead performs beam sweeping (e.g., of multiple transmit beams of a serving cell, and/or using multiple receive beams of the wireless device), beam measurements, and beam selection to determine a beam to use to attempt the PRACH procedure to establish the second RRC connection. Conversely, in this example, if the wireless device has not undergone mobility and/or changed position since releasing the first RRC connection, the wireless device may determine to use the stored beam and antenna information to establish the second RRC connection. In such a scenario, it may be the case that the wireless device attempts the PRACH procedure to establish the second RRC connection using the stored antenna and beam information for the first RRC connection (e.g., potentially without performing beam sweeping and measurements).

Note that the determination of whether the wireless device has changed position may be based on one or more motion and/or rotation thresholds, according to some embodiments. For example, the wireless device may determine whether it has experienced motion greater than a motion threshold or experienced rotation greater than a rotation threshold since releasing the first RRC connection, and if it has, the wireless device may determine that it has changed position. In some instances, the threshold(s) may further depend on a frequency range in which the wireless device is operating. For example, in 3GPP frequency range 1 (FR1), it may be the case that beam use is less sensitive to motion and/or rotation than in 3GPP frequency range 2 (FR2), at least in some instances. Thus, at least according to some embodiments, it may be the case that the wireless device further determines a frequency range associated with the stored antenna information and beam information for the first RRC connection, and that one or more of the motion threshold or the rotation threshold is determined based at least in part on the frequency range associated with the stored antenna information and beam information for the first RRC connection.

In some instances, the wireless device may update its stored beam information and antenna information while it does not have a RRC connection, e.g., in case the best beam changes, possibly even if the wireless device has not changed position. For example, in some instances, it could occur that an object is interposed between the wireless device and the serving cell that blocks line of sight or otherwise causes interference, e.g., even if the wireless device remains stationary. Accordingly, at least in some instances, the wireless device may periodically or aperiodically perform beam sweeping and measurements to determine the best beam, and may update its stored beam and antenna information while remaining in RRC idle or RRC inactive if there is a new best beam. Such an update could be triggered based at least in part on wireless medium conditions for the wireless device; for example, if signal strength and/or signal quality falls below a certain threshold, the wireless device may perform such an update, e.g., to attempt to obtain better signal strength and/or signal quality. As another (e.g., additional or alternative) possibility, such an update could be triggered based at least in part on one or more power supply conditions for the wireless device; for example, as long as the wireless device is connected to a power source or has battery reserves above a certain threshold, the wireless device may periodically perform such an update, e.g., in case of a new source of interference, removal of a previous source of interference, etc.

Note that the wireless device may operate in RRC inactive, or RRC idle, and/or may be powered off between releasing the first RRC connection and establishing the second RRC connection, according to various embodiments. For example, establishing the second RRC connection could include transitioning from RRC inactive by sending a RRC Resume Request, or could include sending a RRC Setup Request when performing initial system selection after being powered on or while otherwise operating in RRC idle, among various other possibilities.

Thus, the method of FIG. 5 may provide an approach to performing beam selection that may reduce connection setup latency and/or may reduce wireless device power consumption, at least in certain circumstances.

FIGS. 6-9—Additional Information

FIGS. 6-9 and the following information are provided as being illustrative of further considerations and possible implementation details relating to the method of FIG. 5, and are not intended to be limiting to the disclosure as a whole. Numerous variations and alternatives to the details provided herein below are possible and should be considered within the scope of the disclosure.

3GPP 5G NR networks may be designed to support 3 broad service categories, including enhanced mobile broadband (eMBB), massive machine type communication (mMTC), and ultra-reliable low latency communications (URLLC).

Figure 6:
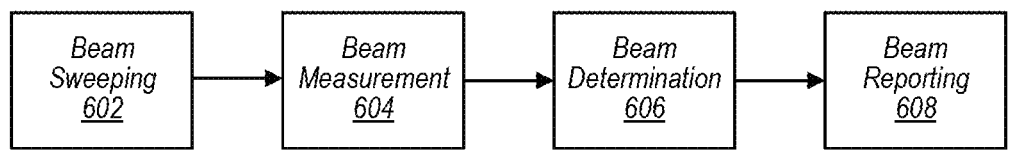
FIG. 6 is a flowchart diagram illustrating aspects of an exemplary possible beam selection procedure, according to some embodiments.

In 5G NR, it may be the case that a UE needs to perform a variety of beam management actions. As shown in FIG. 6, these may include beam sweeping (602), beam measurement (604), beam determination (606), and beam reporting (608). In some instances, a UE may need to measure the reference signal received power (RSRP) of a relatively large number of beams (e.g., up to 64, for a gNB operating in frequency range 2 (FR2), as one possibility) to select the best beam. This may be a relatively time consuming process, which may be particularly significant for applications/use cases with requirements for low latency and/or more generally in view of targeted latency values (e.g., 1 ms, as one possibility) for 5G NR.

In 5G NR, there may be 3 RRC states, at least according to some embodiments. These may include RRC connected, RRC idle, and RRC inactive. The RRC inactive state may be used in 5G NR to reduce the time for a UE to move to RRC connected relative to the RRC idle state while consuming less power than remaining in the RRC connected state. In the RRC inactive state, the data context of the UE may be saved at the gNB when a data connection is suspended, and the UE may be able to use a special MAC identifier to resume the data context when resuming the suspended data session.

At least in some deployments, it may be common for a 5G NR gNB to support an array antenna (e.g., a 64 element phased array antenna, as one possibility; other antenna configurations are also possible) in a high frequency millimeter wave (mmWave) frequency range for beamforming. In such a deployment, it may be the case that multiple beams are transmitted by the gNB at a given time, e.g., to increase the spacial area covered by the gNB.

Similarly, it may be the case that at least some 5G NR UEs may be designed to support multiple antenna panels, each potentially having multiple antenna elements. For example, in some instances, a UE could be designed to support 4-8 antenna elements in each antenna panel. Other numbers of antenna elements are also possible.

Thus, if all of antenna elements of a UE are used when measuring and selecting from the gNB beams every time the UE transitions from RRC idle to RRC connected or from RRC inactive to RRC connected, this may cause a significant amount of power consumption by the UE.

The manner in which certain aspects of UE beam measurement and reporting are performed may be specified by 3GPP specification documents, while other aspects may be left to UE implementation, at least according to some embodiments. For example, it may be the case that the network can configure the UE to report measurement information per beam (which can either include measurement results per beam with respective beam identifier(s) or only beam identifier(s)), e.g., as described in 3GPP 38.331, 5.5.3.3a v. 15.7.0, at least according to some embodiments. If beam measurement information is configured to be included in measurement reports, the UE may apply layer 3 beam filtering as specified in 3GPP 38.331, 5.5.3.2 v. 15.7.0, at least according to some embodiments. However, it may be the case that the exact layer 1 filtering of beam measurements used to derive cell measurement results may be considered implementation dependent.

Figure 7:
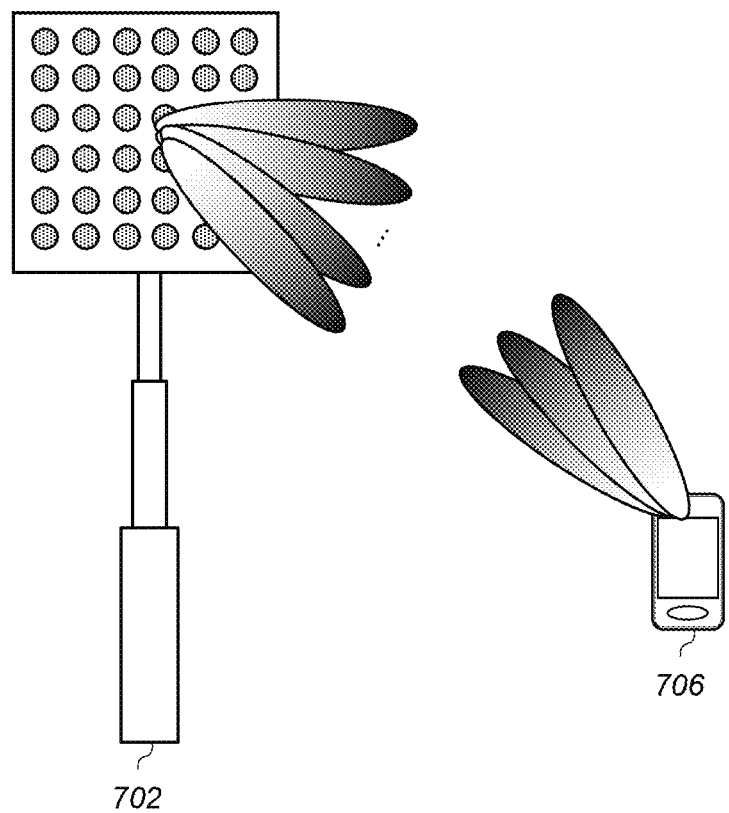
FIG. 7 illustrates various antenna and beam characteristics of an exemplary possible gNB and UE, according to some embodiments.

Thus, as one possible scenario, initially when a UE is powered on, the UE may need to determine which gNB beam to use. This process may include the UE using each of its possible receive beams to measure all of the gNB beams. FIG. 7 illustrates aspects of such a scenario in which a gNB 702 and a UE 706 perform beam selection, according to some embodiments.

Once the best beam from both the UE and the gNB is identified, the UE may use its best beam to initiate a random access channel (RACH) procedure to the best gNB beam. After the RACH procedure is successful, the UE may enter the RRC connected state. Once the packet service (PS) session is over, the UE may transition to the RRC inactive state. When the UE would want to resume the PS session, the same beam measurement procedure may be performed, similarly followed by a RACH procedure. As previously noted, this may be a relatively time consuming process, which may be particularly relevant for latency sensitive URLLC devices/applications. Additionally, it may be a relatively costly process with respect to energy consumption, which may be particularly relevant for mMTC devices/applications with highly constrained battery reserves.

Accordingly, it may be beneficial to introduce techniques that can reduce the time and power consumption costs of beam measurement and selection, at least in some instances. As one such possibility, a UE may be able to store historical beam information for the UE, and determine if it can be used (e.g., in place of a full beam measurement and selection procedure) to select a beam when performing initial system selection and/or more generally when transitioning to RRC connected mode.

According to such a technique, it may be the case that every time the UE transitions from RRC connected to RRC idle or RRC inactive, the UE may save information indicating the last used antenna element and beam, along with angle, azimuth, and elevation details for the UE. The UE may create and maintain a "UE Beam Reference Table" (and/or may use any of various other possible data storage formats). The table may contain the mapping of the last used antenna and the corresponding antenna element of the antenna, along with the angle, azimuth, and elevation values, to the physical cell identifier (PCI) and beam identifier, as well as a location mapping (e.g., using GPS coordinates and/or Wi-Fi SSID information). An example of such a UE Beam Reference Table is illustrated in FIG. 8. When transitioning to RRC connected (either in a UE originated or network originated manner), the UE may use the last saved antenna element and beam information to initiate the physical RACH (PRACH) procedure for sending a RRCConnectionResume Request to the serving gNB, e.g., if it is determined to be applicable.

Figure 9:
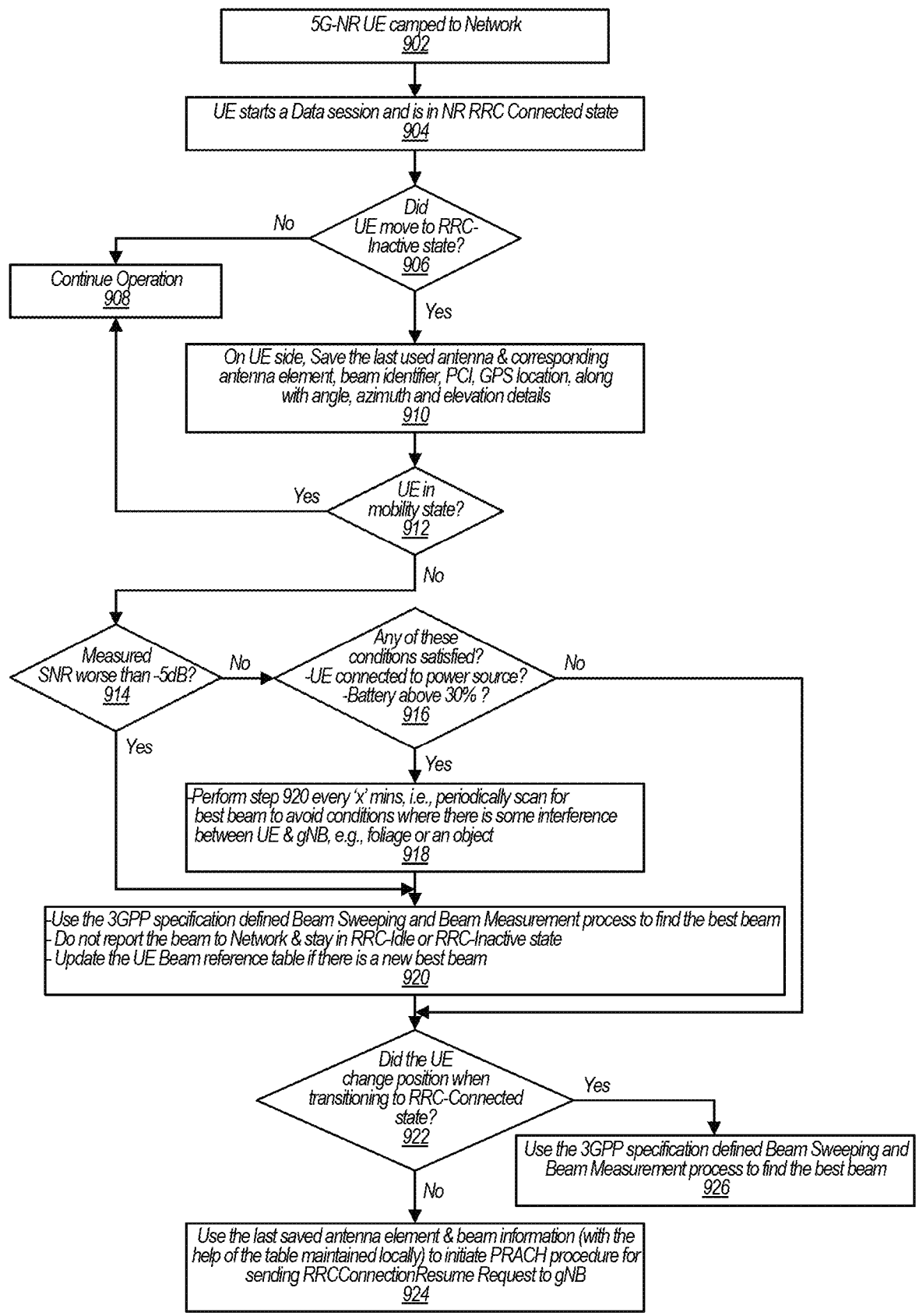
FIG. 9 is a flowchart diagram illustrating further exemplary aspects of a possible method for a wireless device to perform low latency communication using historical beam information, according to some embodiments.

FIG. 9 is a flowchart diagram illustrating further exemplary aspects of such a possible method for a UE to perform low latency communication using historical beam information. As shown, in 902, the UE may initially be camped to a 5G NR network (e.g., in standalone (SA) mode). In 904, the UE may start a data session and may enter NR RRC connected state. In 906, the UE may determine if it has moved to RRC inactive state. If not, 908, the UE may continue operation, e.g., without use of historical beam information for beam selection. If the UE has moved to RRC inactive, in 910, the UE may save the last used antenna and corresponding antenna element, beam identifier, PCI, GPS location, and angle, azimuth, and elevation details for the UE, e.g., in a table such as the UE Beam Reference Table illustrated in FIG. 8. In 912, the UE may determine if it is in a mobility state. If so, the UE may proceed to step 908 and continue operation, e.g., without use of historical beam information for beam selection, as it may be the case that such information would not be applicable to the UE's beam selection process due to the mobility of the UE, at least according to some embodiments.

If the UE is not in a mobility state, in 914, the UE may determine if the measured signal to noise ratio (SNR) for the gNB to which the UE is attached is worse than a certain SNR threshold (e.g., −5 dB, as illustrated, or any other desired threshold). If the SNR is worse than the SNR threshold, in 920, the UE may use the 3GPP specification defined beam sweeping and beam measurement process to find the best beam, and may update the UE Beam Reference Table if there is a new best beam. It may be the case that the UE remains in the RRC idle or RRC inactive state and does not report the selected beam to the network at this time.

If the measured SNR is not worse than the specified SNR threshold, in 916, the UE may determine whether one or more power supply related conditions are satisfied. Such conditions could include the UE being connected to a power source, or having battery reserves above a certain threshold (e.g., 30%, as illustrated, or any other desired threshold). If so, in 918, the UE may periodically (e.g., every 'x' minutes, or at any of various other periodicities, possibly measured in any of various other possible time increments) perform step 920. This may help avoid conditions in which there is some blockage or interference between the UE and the gNB, such as foliage, a person, a vehicle, etc.

If none of the specified power supply related conditions are satisfied (e.g., if the UE is in a battery constrained state), the UE may skip steps 918 and 920 and proceed to 922, in which the UE may determine if it has changed position when transitioning from RRC inactive to RRC connected state. If the UE has not changed position, in 924, the UE may use the last saved antenna element and beam information (e.g., using the information stored in the UE Beam Reference Table) to initiate a PRACH procedure for sending a RRC-ConnectionResume Request to the gNB. Alternatively, if the UE has changed position when transitioning from RRC inactive to RRC connected state, in 926, the UE may use the 3GPP specification defined beam sweeping and beam measurement process to find the best beam, and may use the selected beam to initiate a PRACH procedure for sending a RRCConnectionResume Request to the gNB.

It may be the case that a similar technique could be used when performing system selection, at least in some instances. For example, as according to 3GPP 38.304, 5.2.1 v. 15.5.0, for cell selection in multi-beam operations, measurement quantity of a cell may be up to UE implementation, when a UE powers on for any of various possible reasons, it may be possible to use the last saved antenna element and beam information to initiate a PRACH procedure for sending a RRCSetupRequest to the gNB, e.g., provided the position of the UE has not changed from before powering off to powering back on. Such position determination could be performed using any of various motion sensing capabilities of the UE (motion senor, gyro sensor, accelerometer, etc.), according to some embodiments.

Such a technique may be useful in any of various possible scenarios. For example, as one possibility, a wireless device such as a cellular phone or a tablet computer could be in a RRC idle or RRC inactive state while resting on a desk, and could experience a hard reset (e.g., due to baseband crash, communication center crash, etc.), which would require it to perform system selection. As another possibility, a predominantly stationary wireless device (e.g., any of various types of heavy machinery that is rarely moved) could use such a technique when being reset according to a regular reset interval (e.g., once a day) such that power-up and system selection is performed.

Thus, the techniques described herein may be used in a variety of scenarios to reduce power consumption and latency for RRC idle to RRC connected and RRC inactive to RRC connected state transitions in at least some circumstances. The techniques may be useful for high reliability low latency devices/applications such as autonomous vehicles, medical equipment, factory automation, and/or for relatively low mobility, battery power constrained devices/applications, among various other possible devices and applications.

In the following further exemplary embodiments are provided.

One set of embodiments may include an apparatus, comprising: a processor configured to cause a wireless device to: establish a first radio resource control (RRC) connection; release the first RRC connection; store antenna information and beam information for the first RRC connection; and establish a second RRC connection, wherein the stored antenna information and beam information for the first RRC connection is used to establish the second RRC connection.

According to some embodiments, the processor is further configured to cause the wireless device to: store device location information and device orientation information for the first RRC connection, wherein the device location information and device orientation information for the first RRC connection is associated with the antenna information and beam information for the first RRC connection; determine whether the wireless device has undergone mobility and/or changed position since releasing the first RRC connection based at least in part on the device location information and device orientation information for the first RRC connection; and determine whether to use the stored antenna information and beam information for the first RRC connection to establish the second RRC connection based at least in part on whether the wireless device has undergone mobility and/or changed position since releasing the first RRC connection.

According to some embodiments, the processor is further configured to cause the wireless device to: determine to use the stored antenna information and beam information for the first RRC connection to establish the second RRC connection if the wireless device has not undergone mobility and is in a same position as when releasing the first RRC connection; and determine to not use the stored antenna information and beam information for the first RRC connection to establish the second RRC connection if the wireless device has undergone mobility or changed position since releasing the first RRC connection.

According to some embodiments, establishing the second RRC connection includes performing a physical random access channel (PRACH) procedure using an antenna element and beam indicated in the stored antenna information and beam information for the first RRC connection to send a RRC Resume Request after operating in a RRC inactive state.

According to some embodiments, establishing the second RRC connection includes performing a physical random access channel (PRACH) procedure using an antenna element and beam indicated in the stored antenna information and beam information for the first RRC connection to send a RRC Setup Request during system selection.

According to some embodiments, establishing the second RRC connection includes performing a physical random access channel (PRACH) procedure using an antenna element and beam indicated in the stored antenna information and beam information for the first RRC connection to send a RRC Setup Request after operating in a RRC idle state.

Another set of embodiments may include a wireless device, comprising: a plurality of antennas, wherein each antenna includes a plurality of antenna elements; a radio operably coupled to the antennas; and a processor operably coupled to the radio; wherein the wireless device is configured to: establish a first radio resource control (RRC) connection; release the first RRC connection; store antenna information and beam information for the first RRC connection; and determine whether to use the stored antenna information and beam information for the first RRC connection to establish a second RRC connection; and establish the second RRC connection, wherein the stored antenna information and beam information for the first RRC connection is used to establish the second RRC connection if the wireless device determines to use the stored antenna information and beam information for the first RRC connection to establish the second RRC connection.

According to some embodiments, the wireless device is further configured to: determine whether the wireless device has undergone mobility since releasing the first RRC connection; wherein whether to use the stored antenna information and beam information for the first RRC connection to establish the second RRC connection is determined based at least in part on whether the wireless device has undergone mobility since releasing the first RRC connection.

According to some embodiments, if wireless device has undergone mobility since releasing the first RRC connection, the stored antenna information and beam information for the first RRC connection is not used to establish the second RRC connection.

According to some embodiments, the wireless device is further configured to: determine whether the wireless device has experienced motion greater than a motion threshold or experienced rotation greater than a rotation threshold since releasing the first RRC connection; wherein if wireless device has experienced motion greater than the motion threshold or experienced rotation greater than the rotation threshold since releasing the first RRC connection, the stored antenna information and beam information for the first RRC connection is not used to establish the second RRC connection.

According to some embodiments, the wireless device is further configured to: determine a frequency range associated with the stored antenna information and beam information for the first RRC connection; wherein one or more of the motion threshold or the rotation threshold is determined based at least in part on the frequency range associated with the stored antenna information and beam information for the first RRC connection.

According to some embodiments, to establish the second RRC connection using the stored antenna information and beam information for the first RRC connection, the wireless device is further configured to: use an antenna element and beam indicated in the stored antenna information and beam information for the first RRC connection to send one of: a RRC Setup Request; a RRC Resume Request; a RRC Re-establishment Request; or a RRC SystemInfo Request.

According to some embodiments, the wireless device is further configured to: store orientation information and location information associated with the antenna information and beam information for the first RRC connection.

Still another set of embodiments may include a method, comprising: by a wireless device: establishing a first radio resource control (RRC) connection; releasing the first RRC connection; storing first beam information, wherein the first beam information identifies a beam used by the wireless device for the first RRC connection; determining whether the wireless device has undergone mobility or changed orientation since releasing the first RRC connection; and determining whether to use the first beam information to establish a second RRC connection based at least in part on whether the wireless device has undergone mobility or changed orientation since releasing the first RRC connection.

According to some embodiments, the method further comprises: performing beam selection for the second RRC connection using the first beam information if the wireless device has not undergone mobility or changed orientation since releasing the first RRC connection; performing beam selection for the second RRC connection without using the first beam information if the wireless device has undergone mobility or changed orientation since releasing the first RRC connection; and establishing the second RRC connection.

According to some embodiments, performing beam selection for the second RRC connection without using the first beam information further comprises: performing beam sweeping to measure each of a plurality of transmit beams provided by a cellular base station using each of a plurality of receive beams of the wireless device; and selecting a beam for the second RRC connection based at least in part on the beam sweeping.

According to some embodiments, the method further comprises: determining whether to update the first beam information while the wireless device does not have a RRC connection.

According to some embodiments, whether to update the first beam information while the wireless device does not have a RRC connection is determined based at least in part on one or more power supply or battery conditions for the wireless device.

According to some embodiments, whether to update the first beam information while the wireless device does not have a RRC connection is determined based at least in part on wireless medium conditions for the wireless device.

According to some embodiments, the beam information further comprises one or more of: an indication of a synchronization signal block index associated with the beam; an indication of a cell associated with the beam; an indication of one or more antennas and associated antenna elements used by the wireless device to form the beam; an indication of an orientation of the wireless device associated with the beam; or an indication a location information of the wireless device associated with the beam.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
a processor configured to cause a wireless device to:
establish a first radio resource control (RRC) connection;
release the first RRC connection;
store antenna information and beam information for the first RRC connection; and
establish a second RRC connection,
wherein the stored antenna information and beam information for the first RRC connection is used to establish the second RRC connection.

2. The apparatus of claim 1, wherein the processor is further configured to cause the wireless device to:
store device location information and device orientation information for the first RRC connection, wherein the device location information and device orientation information for the first RRC connection is associated with the antenna information and beam information for the first RRC connection;
determine whether the wireless device has undergone mobility and/or changed position since releasing the first RRC connection based at least in part on the device location information and device orientation information for the first RRC connection; and
determine whether to use the stored antenna information and beam information for the first RRC connection to establish the second RRC connection based at least in part on whether the wireless device has undergone mobility and/or changed position since releasing the first RRC connection.

3. The apparatus of claim 2, wherein the processor is further configured to cause the wireless device to:
determine to use the stored antenna information and beam information for the first RRC connection to establish the second RRC connection if the wireless device has not undergone mobility and is in a same position as when releasing the first RRC connection; and
determine to not use the stored antenna information and beam information for the first RRC connection to establish the second RRC connection if the wireless device has undergone mobility or changed position since releasing the first RRC connection.

4. The apparatus of claim 1,
wherein establishing the second RRC connection includes performing a physical random access channel (PRACH) procedure using an antenna element and beam indicated in the stored antenna information and beam information for the first RRC connection to send a RRC Resume Request after operating in a RRC inactive state.

5. The apparatus of claim 1,
wherein establishing the second RRC connection includes performing a physical random access channel (PRACH) procedure using an antenna element and beam indicated in the stored antenna information and beam information for the first RRC connection to send a RRC Setup Request during system selection.

6. The apparatus of claim 1,
wherein establishing the second RRC connection includes performing a physical random access channel (PRACH) procedure using an antenna element and beam indicated in the stored antenna information and beam information for the first RRC connection to send a RRC Setup Request after operating in a RRC idle state.

7. A wireless device, comprising:
a plurality of antennas, wherein each antenna includes a plurality of antenna elements;
a radio operably coupled to the antennas; and
a processor operably coupled to the radio;
wherein the wireless device is configured to:
establish a first radio resource control (RRC) connection;
release the first RRC connection;
store antenna information and beam information for the first RRC connection; and
determine whether to use the stored antenna information and beam information for the first RRC connection to establish a second RRC connection; and
establish the second RRC connection,
wherein the stored antenna information and beam information for the first RRC connection is used to establish the second RRC connection if the wireless device determines to use the stored antenna information and beam information for the first RRC connection to establish the second RRC connection.

8. The wireless device of claim 7, wherein the wireless device is further configured to:
determine whether the wireless device has undergone mobility since releasing the first RRC connection;
wherein whether to use the stored antenna information and beam information for the first RRC connection to establish the second RRC connection is determined based at least in part on whether the wireless device has undergone mobility since releasing the first RRC connection.

9. The wireless device of claim 8,
wherein if wireless device has undergone mobility since releasing the first RRC connection, the stored antenna information and beam information for the first RRC connection is not used to establish the second RRC connection.

10. The wireless device of claim 7, wherein the wireless device is further configured to:

determine whether the wireless device has experienced motion greater than a motion threshold or experienced rotation greater than a rotation threshold since releasing the first RRC connection;

wherein if wireless device has experienced motion greater than the motion threshold or experienced rotation greater than the rotation threshold since releasing the first RRC connection, the stored antenna information and beam information for the first RRC connection is not used to establish the second RRC connection.

11. The wireless device of claim 10, wherein the wireless device is further configured to:

determine a frequency range associated with the stored antenna information and beam information for the first RRC connection;

wherein one or more of the motion threshold or the rotation threshold is determined based at least in part on the frequency range associated with the stored antenna information and beam information for the first RRC connection.

12. The wireless device of claim 7, wherein to establish the second RRC connection using the stored antenna information and beam information for the first RRC connection, the wireless device is further configured to:

use an antenna element and beam indicated in the stored antenna information and beam information for the first RRC connection to send one of:
a RRC Setup Request;
a RRC Resume Request;
a RRC Re-establishment Request; or
a RRC SystemInfo Request.

13. The wireless device of claim 7, wherein the wireless device is further configured to:

store orientation information and location information associated with the antenna information and beam information for the first RRC connection.

14. A method, comprising:
by a wireless device:
establishing a first radio resource control (RRC) connection;
releasing the first RRC connection;
storing first beam information, wherein the first beam information identifies a beam used by the wireless device for the first RRC connection;
determining whether the wireless device has undergone mobility or changed orientation since releasing the first RRC connection; and
determining whether to use the first beam information to establish a second RRC connection based at least in part on whether the wireless device has undergone mobility or changed orientation since releasing the first RRC connection.

15. The method of claim 14, wherein the method further comprises:

performing beam selection for the second RRC connection using the first beam information if the wireless device has not undergone mobility or changed orientation since releasing the first RRC connection;

performing beam selection for the second RRC connection without using the first beam information if the wireless device has undergone mobility or changed orientation since releasing the first RRC connection; and establishing the second RRC connection.

16. The method of claim 15, wherein performing beam selection for the second RRC connection without using the first beam information further comprises:

performing beam sweeping to measure each of a plurality of transmit beams provided by a cellular base station using each of a plurality of receive beams of the wireless device; and selecting a beam for the second RRC connection based at least in part on the beam sweeping.

17. The method of claim 14, wherein the method further comprises:

determining whether to update the first beam information while the wireless device does not have a RRC connection.

18. The method of claim 17, wherein whether to update the first beam information while the wireless device does not have a RRC connection is determined based at least in part on one or more power supply or battery conditions for the wireless device.

19. The method of claim 17, wherein whether to update the first beam information while the wireless device does not have a RRC connection is determined based at least in part on wireless medium conditions for the wireless device.

20. The method of claim 14, wherein the beam information further comprises one or more of:

an indication of a synchronization signal block index associated with the beam;

an indication of a cell associated with the beam;

an indication of one or more antennas and associated antenna elements used by the wireless device to form the beam;

an indication of an orientation of the wireless device associated with the beam; or an indication a location information of the wireless device associated with the beam.

* * * * *